REEL STORING DEVICE

Filed Oct. 24, 1957

INVENTOR.
CHARLES G. McPROUD
BY
Stuart F. Moore
ATTORNEY

United States Patent Office
2,992,053
Patented July 11, 1961

2,992,053

REEL STORING DEVICE

Charles G. McProud, 10 Post Lane, East Williston, N.Y.
Filed Oct. 24, 1957, Ser. No. 692,166
2 Claims. (Cl. 312—20)

This invention relates to storing devices and, more particularly, to storing devices of the type having a housing surrounding at least one movable article container. The invention is particularly adaptable for use in storing reels of strip material such as magnetic tape or motion picture film.

Ribbon-like material such as magnetic recording tape, motion picture film, selected fabrics and the like are generally stored for future use by winding the tape on to circular reels and then placing the reels into an individual box or metal can. Heretofore, access to the reels has been difficult and time consuming since each container must be individually opened, the selected reel removed, and then after it has been used, replaced in the container and the container again sealed about the reel. Furthermore, such individual boxing does not facilitate classification of the material contained on the reels inasmuch as the removal of one box from a stack of such boxes has disturbed the classified order of the remaining boxes.

The storing of reels in individual, circular boxes or cans has made the storing of a plurality thereof inconvenient as such circular containers must be necessarily stored in a horizontal position. In addition, the storing of reels of several different diameters has resulted in an untidy array of individual storing boxes which are hard to arrange in a stacked assembly and are equally difficult to provide an orderly classification thereof.

It is therefore an object of the present invention to provide a cabinet for storing a plurality of reels for strip material in an aligned arrangement wherein each reel is independently and easily accessible.

It is a further object of the invention to provide a cabinet for storing a plurality of reels for strip material which facilitates easy classification thereof.

It is a further object of the invention to provide a cabinet for storing a plurality of reels of strip material wherein a selected reel may be removed and replaced without disturbing the position of other stored reels.

It is yet another object of the invention to provide a storage cabinet which may be quickly adapted to store a plurality of reels of strip material having different diameters.

Figure 1:
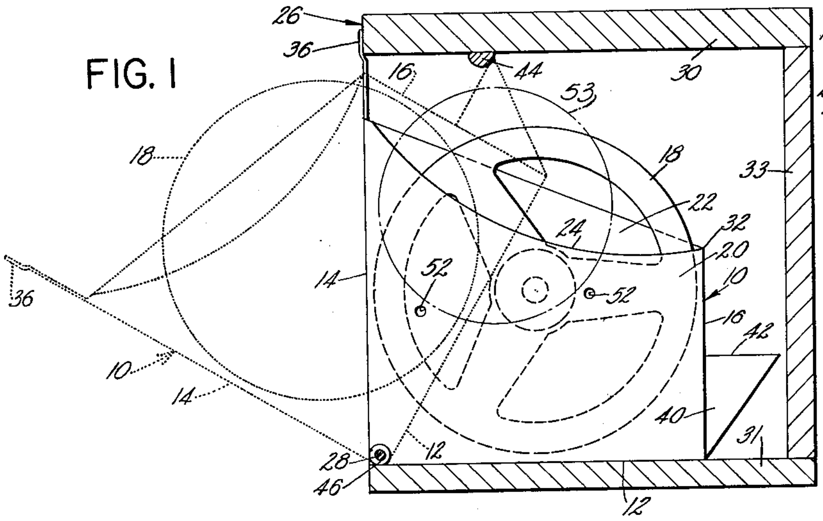
Figure 2:
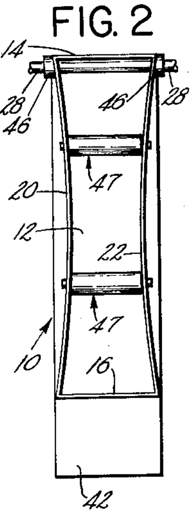
Figure 4:
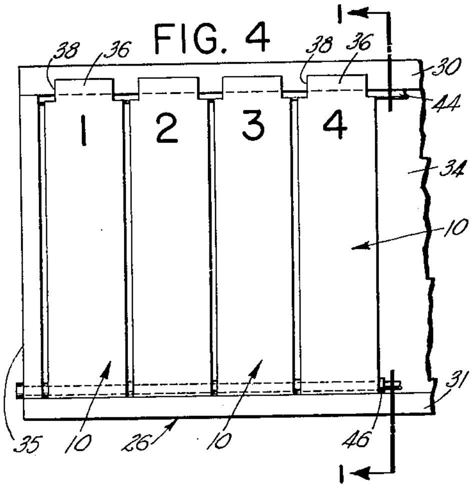
Figure 5:
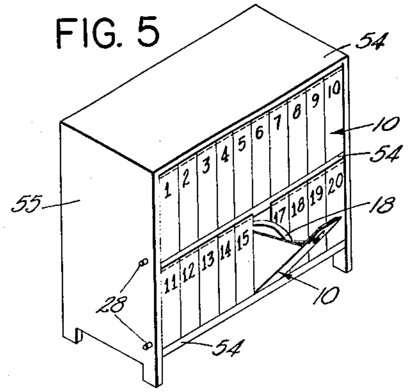
Figure 6:
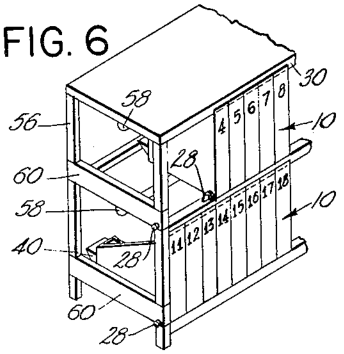
Figure 3:
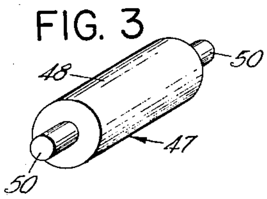

For a better understanding of the invention, together with other and further objects thereof, reference is made to the following detailed description taken in connection with the accompanying drawings, in which:

FIGURE 1 is a sectional end elevation taken along the lines 1—1 of FIGURE 4, showing a single container in a retracted, upright position, with the container indicated in dotted outline in a forward position, FIGURE 2 is a plan view of an empty container of the present invention, showing adaptor pins for smaller reels in position, FIGURE 3 is a perspective view of an adaptor pin of FIGURE 2, FIGURE 4 is a fragmentary front elevation of a plurality of reel containers organized in a housed assembly, with a portion of the housing broken away, FIGURE 5 is a perspective view of a modification of the assembly of FIGURE 4, FIGURE 6 is a fragmentary perspective view of another modification of the assembly of FIGURE 4.

Referring now to the drawings, in FIGURE 1 is shown a preferred embodiment of a reel container of the present invention having a reel in stored position. The container 10 has a bottom member 12 to which are secured members 14, 16 which provide front and rear wall panels respectively, for container 10. The members 12, 14, 16 preferably have a width of a slightly greater dimension than the reel which they are adapted to maintain in stored position in order to facilitate the removal of the reel. Such a reel is indicated, for purposes of illustration, as 18 on the drawings. While a reel of the type adapted to have magnetic recording tape wound thereon is shown, yet it will be understood that the cabinet of the present invention is adapted to store any similar type reel such as reels for motion picture film, ribbon fabric material or the like.

Secured to the outer marginal edges of bottom member 12 and front and rear wall members 14, 16 are side wall panel members 20, 22. The five members, when assembled together, form a movable container or compartment 10 for snugly storing the reels therein. Front and rear wall members 14, 16 are of unequal lengths so that the upper edges of walls 20, 22 are inclined rearwardly towards member 16. One edge 24 of the wall members 20, 22 is arcuately curved in a downward direction in order to provide easy insertion of the reel 18, when the container is tilted forwardly and outwardly. To insert a reel within the container 10, the edge of the reel is pressed against the exposed inner portion of wall 22 which acts as a guide when the reel is thrust downwardly into the container. Therefore, a large opening in container 10 is not necessary to provide easy insertion of reel 18.

Container 10 may be rotatably mounted in a surrounding housing or shell 26 by means of a pivot shaft 28 which passes through the walls 20, 22 of container 10 and housing 26 near the lower, front corner thereof and is secured in a suitable manner to the outer walls 35 of housing 26. A pivot shaft is shown to illustrate a preferred means for tilting container 10 outwardly, as it facilitates the assembly of a plurality of containers in juxtaposition in housing 26 as shown in FIGURE 4. Yet it will be understood that any suitable means may be provided which rotatably connects the lower front corner of container 10 to housing 26. Housing 26 may be generally rectangular in shape and have a roof 30, floor 31, rear wall 33 and side walls 35.

Sufficient clearance is provided between the roof 30 of housing 26 and the upper rear edge 32 of rear member 16 to allow the container 10 to pass freely through the front opening 34 in housing 26. Since the upper edges of walls 20, 22 are inclined rearwardly, the front opening 34 in housing 26 need be only slightly greater in size than the dimensional length of front wall member 14 to allow clearance of the container when in a tilted position, as shown in FIGURE 1.

Front wall member 14 has an upwardly extending, stepped tab member 36 which overlaps a portion of housing roof 30 when container 10 is in a stored position and serves as a closure across the remaining portion of opening 34 extending between roof 30 and the marginal upper edge of front wall 14. Tab member 36 also provides a gripping device for tilting container 10 outwardly when it is desired to remove a reel therefrom. Accordingly, tab member 36 may have suitable indentations 38 to facilitate the gripping thereof.

In order that the reel 18 will not spill out of container 10 when it is in a tilted position, stopping means are provided for limiting the forward travel of the container. An embodiment of such a stopping means may be a block 40 affixed to the rear wall member 16 of container 10. Block 40 has a surface 42 which, when container 10 is tilted forwardly, is adapted to engage a stop 44 which may be a suitable protrusion affixed to the roof 30 of housing 26. Stop 44 is located in a position such that container 10 may be tilted forwardly and outwardly sufficient to allow reel 14 to bias the container in its limited open position because of a shift in the center of gravity. The walls 22 preferably are deformed inwardly in a concave fashion as shown in FIGURE 2 in order that reel 14 may be frictionally held in a firm grip therebetween when in a stored position.

To accommodate reels of several different diameters, container 10 has associated for cooperation therewith, pins 47 (FIGURE 3) having body portions 48 which may have a circular or flat surface as desired, with outwardly extending neck portions of lesser diameter 50 which may be inserted in selected apertures 52, located at suitable positions on walls 20, 22 of container 10. Neck portions 50 of pins 47 prevent the pins from passing completely through apertures 52. The apertures are so positioned that a reel 53 smaller in diameter than one filling the entire container 10 will be supported in an upstanding position and protruding therefrom sufficiently to permit it to be grasped firmly and easily when the apertures are joined by pins 47. Pins 47 may be fitted into position simply by expanding the sides 20, 22 slightly and inserting them from the top of container 10. Instead of apertures 52, other suitable means for securing the ends of pins 47 in position may be provided, such as indentations or depressions in the side walls 20, 22.

Although housing 26 may be dimensional so as to enclose only a single container 10, yet the cabinet of the present invention is particularly adapted for storing a large number of reels. This may be done merely by extending the horizontal dimension of housing 26 so as to allow a plurality of containers 10 to be arranged in juxtaposition as shown in FIGURE 4. If desired, a single pivot shaft 28 may pass completely through suitably located apertures in each of the containers 10 with washers or spacers 46 inserted therebetween to prevent chafing of the adjacent sides of the containers 10. While the housing 26 and container 10 may be formed of any suitable material such as cardboard or sheet metal, it has been found that molding the structure from a high impact plastic will provide excellent results.

The housing 26 may be further modified as shown in FIGURES 5 and 6. As shown in FIGURE 5, shelves 54 may be arranged to provide the roofs for the container 10 with shafts 28 passing through the sides 55 of the shelving to hold containers 10 in alignment with suitable stop members secured thereto as described heretofore. The modification shown in FIGURE 5 allows a large number of reels to be stacked in vertical alignment in book shelf fashion.

When dustproofing is not a prime consideration, the arrangement shown in FIGURE 6 may be used. Rack 56 serves as a housing shell or a frame to which pivot means such as shaft 28 may be secured. A rod 58 affixed to side members 60 of frame 56 provides a stop means which cooperates with block 40 to limit the forward tilting of containers 10.

What is claimed is:

1. A storing device for storing annular articles comprising, a plurality of containers arranged in juxtaposition for receiving said articles, each of said containers having a bottom floor member, upwardly extending end panels of unequal lengths affixed to said bottom member and defining front and rear walls of said container, side wall panels affixed to the marginal edges of said bottom member and said end panels, the upper edges of said side wall panels sloping downwardly and terminating at the upper edge of said rear panel to facilitate insertion of said article in said container, a housing surrounding said containers and having an open front to allow said containers to be removed therethrough, a common pivoting axle passing through the lower front portion of each of said containers and said housing, each of said containers being adapted to rotate outwardly about said axle and through said housing opening to provide access to the contents thereof, each of said containers having at least one removable brace member positioned wholly within the interior thereof and extending transversely between said side wall panels to terminate therebetween, said side wall panels having means disposed at varying depths within said container for securing said removable brace member associated therewith to indepedently reduce the storage capacity of said container, said brace member being positionable independent of the position of a corresponding brace member disposed in an adjacent container to provide storage of annular articles of diverse diameters in said adjacent containers, each of said articles, when in a stored position having body portions extending above the rear wall of its associated container.

2. The storing device defined in claim 1 wherein said brace member securing means includes apertures selectively positioned in axial alignment in said side walls and said brace member comprises a removable pin having neck portions adapted to mate with said apertures.

References Cited in the file of this patent

UNITED STATES PATENTS

| | | |
|---|---|---|
| 639,063 | Ladd | Dec. 12, 1899 |
| 1,167,206 | Ogden | Jan. 4, 1916 |
| 1,184,060 | Yerkes | May 23, 1916 |
| 1,685,765 | Mangan | Sept. 25, 1928 |
| 1,733,487 | Hackley | Oct. 29, 1929 |